April 2, 1968   B. A. FULTON   3,375,761
APPARATUS FOR FORMING BOXES
Filed Oct. 20, 1965   10 Sheets-Sheet 1

FIG. 1.

INVENTOR.
BERTRAM A. FULTON
BY
ATTORNEYS

April 2, 1968   B. A. FULTON   3,375,761
APPARATUS FOR FORMING BOXES
Filed Oct. 20, 1965   10 Sheets-Sheet 2

FIG. 2.

INVENTOR.
BERTRAM A. FULTON
BY
ATTORNEYS

April 2, 1968  B. A. FULTON  3,375,761
APPARATUS FOR FORMING BOXES
Filed Oct. 20, 1965  10 Sheets-Sheet 3

FIG. 3.

INVENTOR.
BERTRAM A. FULTON
BY
ATTORNEYS

FIG. 4.

April 2, 1968  B. A. FULTON  3,375,761
APPARATUS FOR FORMING BOXES
Filed Oct. 20, 1965  10 Sheets-Sheet 5

INVENTOR.
BERTRAM A. FULTON
BY

ATTORNEYS

April 2, 1968 B. A. FULTON 3,375,761
APPARATUS FOR FORMING BOXES
Filed Oct. 20, 1965 10 Sheets-Sheet 8

INVENTOR.
BERTRAM A. FULTON
BY
ATTORNEYS

April 2, 1968  B. A. FULTON  3,375,761
APPARATUS FOR FORMING BOXES
Filed Oct. 20, 1965  10 Sheets-Sheet 6

INVENTOR.
BERTRAM A. FULTON
BY

ATTORNEYS

April 2, 1968  B. A. FULTON  3,375,761
APPARATUS FOR FORMING BOXES
Filed Oct. 20, 1965  10 Sheets-Sheet 10

INVENTOR.
BERTRAM A. FULTON
BY
ATTORNEYS

United States Patent Office 3,375,761
Patented Apr. 2, 1968

3,375,761
APPARATUS FOR FORMING BOXES
Bertram A. Fulton, Lynnfield, Mass., assignor to Metal Edge Industries, Barrington, N.J., a corporation of New Jersey
Filed Oct. 20, 1965, Ser. No. 498,384
16 Claims. (Cl. 93—41.1)

This invention relates to an apparatus for forming boxes and more particularly relates to an apparatus for erecting box flats of cardboard, paper or the like and attaching a stay to each corner.

The most commonly employed procedure for erecting and staying box flats today employs an operator and a staying machine such as that disclosed in G. B. Speidel Patent No. 2,997,714 which has a single anvil and die. In this procedure the operator folds the flat and inserts it in the staying machine to apply a stay to one corner. This operation must be repeated by the operator to form the other three corners. Such a procedure involves the use of costly safety mechanisms to protect the operator, high costs, and a low rate of production. The efforts to automate have largely taken the form of a step by step operation involving the use of multiple anvils and dies and stepping the flat from each anvil and die station to the next station. This, of course, involves the employment of relatively costly apparatus and has been found to provide a low rate of production.

It is therefore an object of this invention to provide for the erection of a box flat and staying of the corners without the necessity for the continuous presence of an operator.

It is a further object of this invention to provide for the automatic erection of a box flat and staying of its corners with apparatus which does not greatly exceed in cost conventional staying apparatus which requires an operator.

It is a still further object of this invention to provide for the automatic erection of box flats and the staying of their corners with a high rate of production.

The functioning of the apparatus comprises feeding a box flat to a position below an anvil, erecting a pair of adjacent box sides to abut against the anvil and form a corner and applying a stay to the thus formed corner. The box is then pivoted substantially 90° around the anvil and then one erected side of the box is advanced along the mandrel and a side adjacent the erected side is itself erected to form a corner with the previously erected side and a stay applied to the thus formed corner. The third and fourth corners are similarly formed and stayed and then the box is ejected from the apparatus employed.

The apparatus of the invention will be clarified by a reading of the following description in conjunction with the drawings in which.

Figure 2:
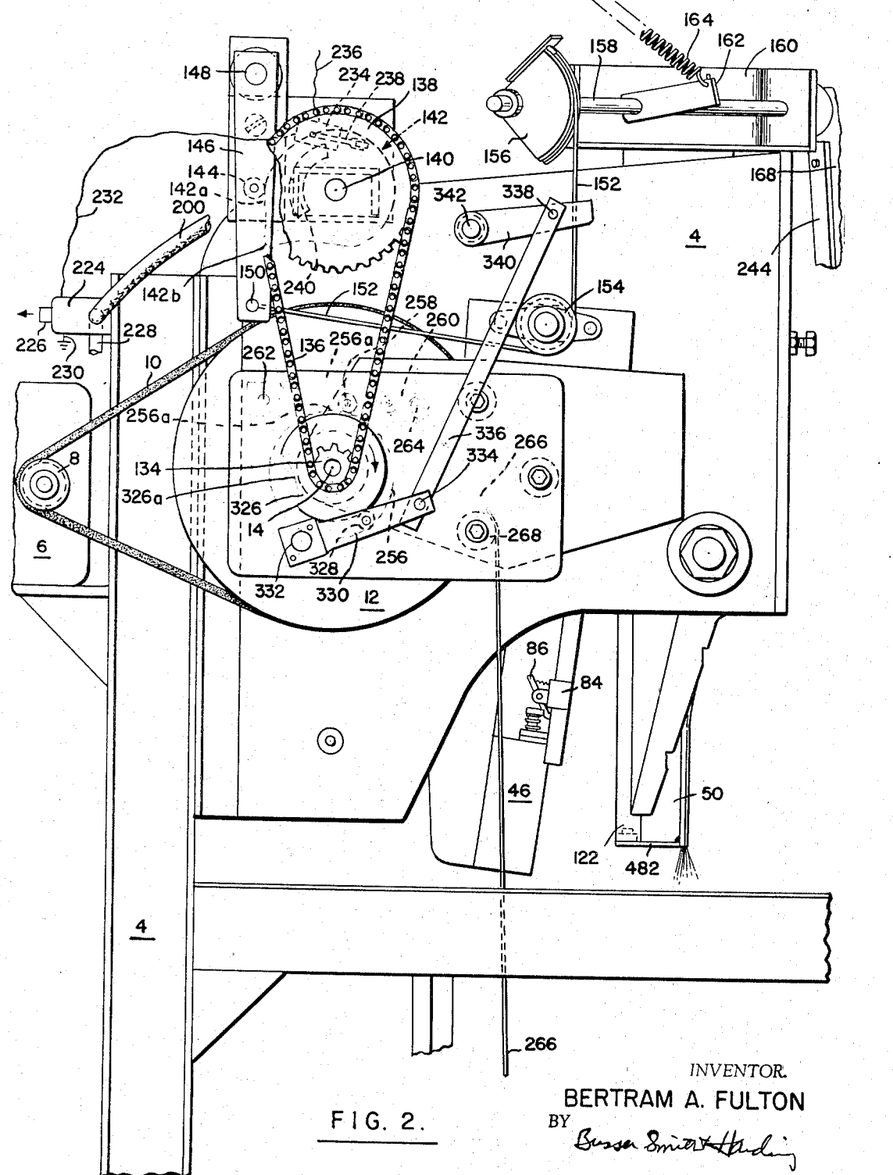
FIGURE 2 is an elevation of the left-hand side of the apparatus of FIGURE 1 as viewed in FIGURE 1 and partially broken away.
Figure 4:
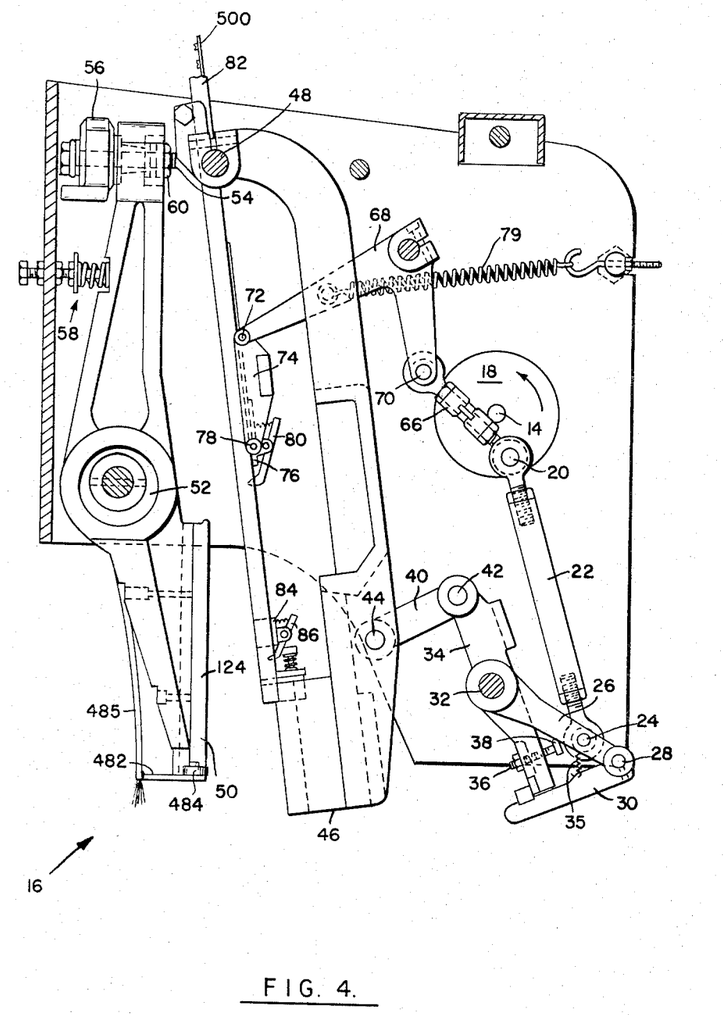
FIGURE 4 is a vertical section through the apparatus of FIGURE 1 showing the staying mechanism per se.

Referring to FIGURE 2, apparatus 2 in accordance with the invention has a frame 4 on which is mounted an electric motor 6 which drives a pulley 8 carrying a belt 10 which in turn drives a pulley 12 secured to shaft 14. Shaft 14 actuates a conventional anvil and die staying mechanism 16 which is best seen in FIGURE 4. Shaft 14 rotates a crank wheel 18 to which is secured a crank pin 20. A link 22 is pivotally secured to crank pin 20 at one end and at its other end is pivotally secured at 24 to a lever 26. Lever 26 is pivotally secured at 28 to a latch member 30 and is mounted for free rotation about a shaft 32. Latch 30 engages a link 34 which is mounted for free rotation about shaft 32 and is held in such engagement by a spring 35. A bolt 36 carries a stop member 38 which is adapted to engage link 22. Link 34 is pivotally connected to a link 40 as indicated at 42 and link 40 in turn is pivotally connected at 44 to a die member 46 which is pivotally mounted at 48. An anvil member 50 cooperating with die member 46 is mounted on an eccentric indicated at 52 and has its upper end as viewed in FIGURE 4 secured in a floating anchor by bolt 54 secured to an anchor member 56, the anchored end of anvil 50 being spring biased upwardly by a spring biasing member indicated at 58 against a nut 60 threaded on bolt 54.

Crank pin 20 also pivotally carries a link 66 which is pivotally connected to a belt crank lever 68 at 70. Lever 68 is pivotally connected at 72 to a link 74 which in turn is pivotally connected to a movable pawl carrier 76 and 78. Lever 68 is biased counterclockwise as viewed in FIGURE 4 by an extension coil spring 79. A spring biased pawl 80 is secured to pawl carrier 76 and is adapted to engage metal stay material guided by throat 82. A fixed pawl carrier 84 carries a spring biased pawl 86.

It is submitted that no more detailed description of the staying mechanism or its operation is required since as described above it is per se conventional and well known to the art. Reference may be had, for example, to George B. Speidel Patent 2,997,714.

Figure 1:
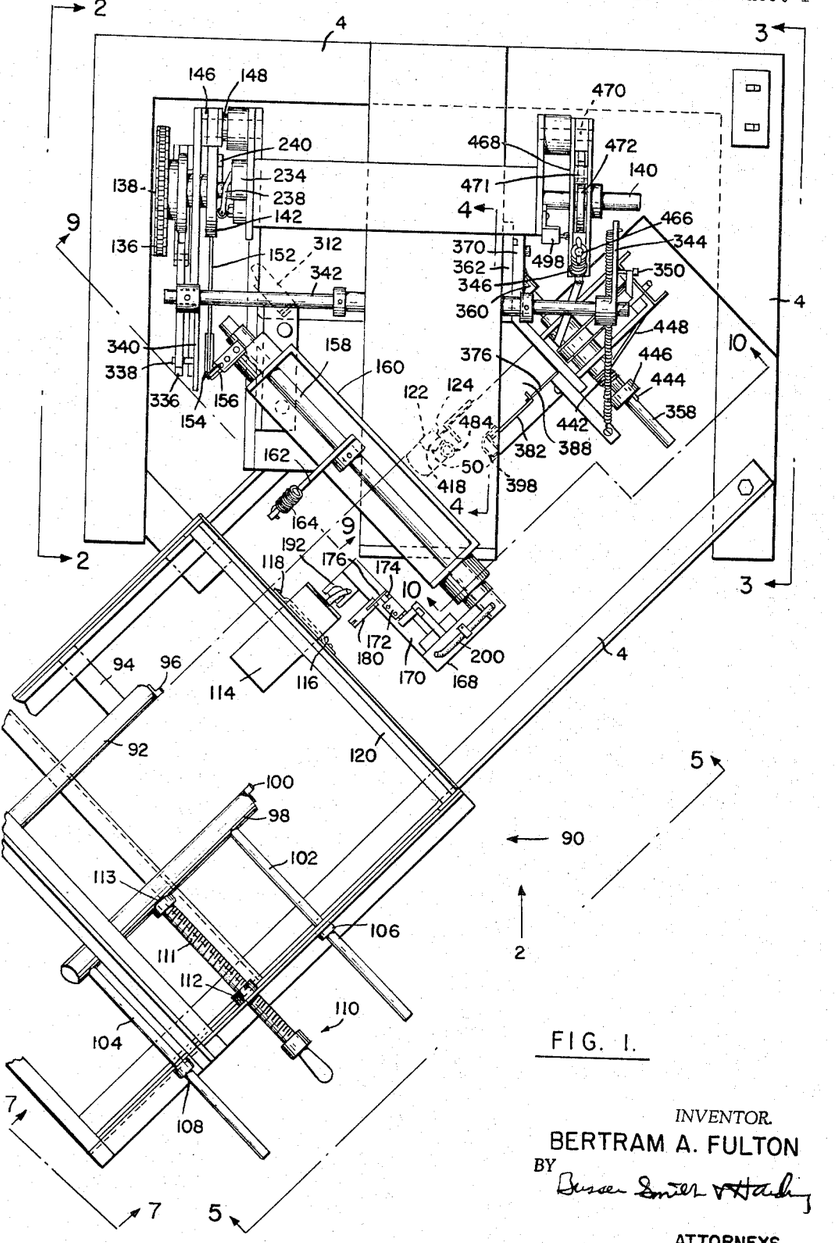
FIGURE 1 is a plan view of apparatus in accordance with the invention.
Figures 5, 6:
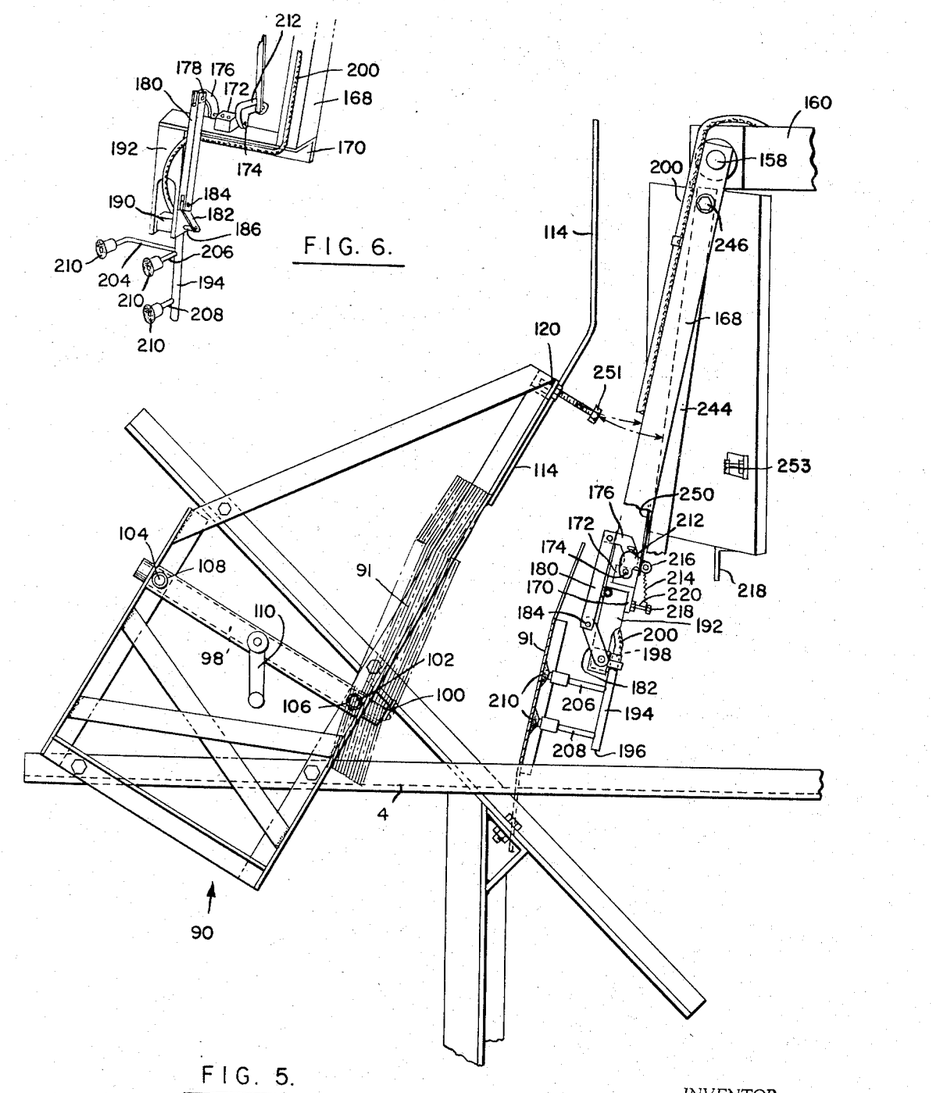
FIGURE 5 is an elevation partially broken away of the apparatus of FIGURE 1 taken on the plane indicated by the line 5—5 in FIGURE 1.
FIGURE 6 is a front perspective view of a portion of the box flat transfer mechanism of the apparatus of FIGURE 1.
Figure 13:
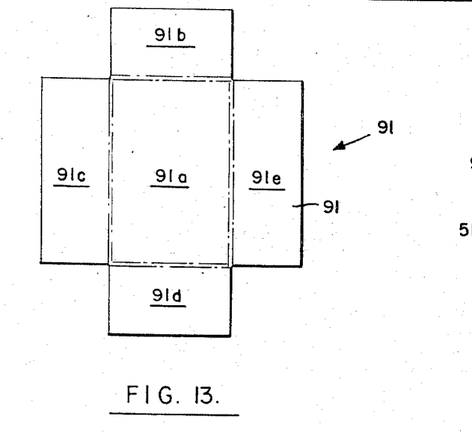
FIGURE 13 is a bottom plan view of a box flat.

As best seen from FIGURES 5 and 6, a magazine 90 is formed in frame 4 for flats 91 which, as best seen in FIGURE 13, each have a bottom panel 91a and side panels 91b, 91c, 91d and 91e. The side panels are "prefolded" before being placed in magazine 90 so that they will extend somewhat upwardly from the bottom panel to facilitate their erection. Magazine 90 has a fixed supporting bar 92 secured to frame 4 by a strap 94 and has a flap retaining pin 96 (FIGURE 1). A companion supporting bar 98 has a flap retaining pin 100 and is fixedly secured to rods 102 and 104 which are respectively slidably mounted in bushings 106 and 108 in frame 4. A crank 110 has a threaded portion 111 which engages a nut 112 secured to frame 4 and has its terminal end rotatably connected to bar 98 as indicated at 113. The upper edge of flats 91 are successively engaged by a retaining strap 114 which is adjustably secured by a strap 116 (FIGURE 8) secured by screws 118 to a cross-member 120 of frame 4.

As shown in FIGURE 1, anvil 50 presents faces 122 and 124 for support during the staying operation. Face 122 lines in the same vertical plane with the inner edge of support 92 and this orientation need never be changed despite adjustments in strap 114 and support 98 to accommodate different size flats. The mechanism for transferring a flat 91 from magazine 90 to anvil 50 will now be described.

Referring first to FIGURE 2, shaft 14 drives a sprocket 134 engaged by a chain 136 which drives a sprocket 138 fixedly secured to shaft 140. A cam 142 fixedly secured to shaft 140 is engaged by a cam follower 144 mounted on a lever 146 which is pivotally secured at 148. Lever 146 at its lower end carries a pin 150 to which is secured a cable 152 which passes around pulley 154 and is secured to quadrant 156. Quadrant 156 is fixedly secured to a shaft 158 mounted for rotation in frame 160 secured to frame 4. A lever 162 is fixedly secured to shaft 158 and biased upwardly as viewed in FIGURE 2 by an extension coil spring 164.

Figures 7, 8:
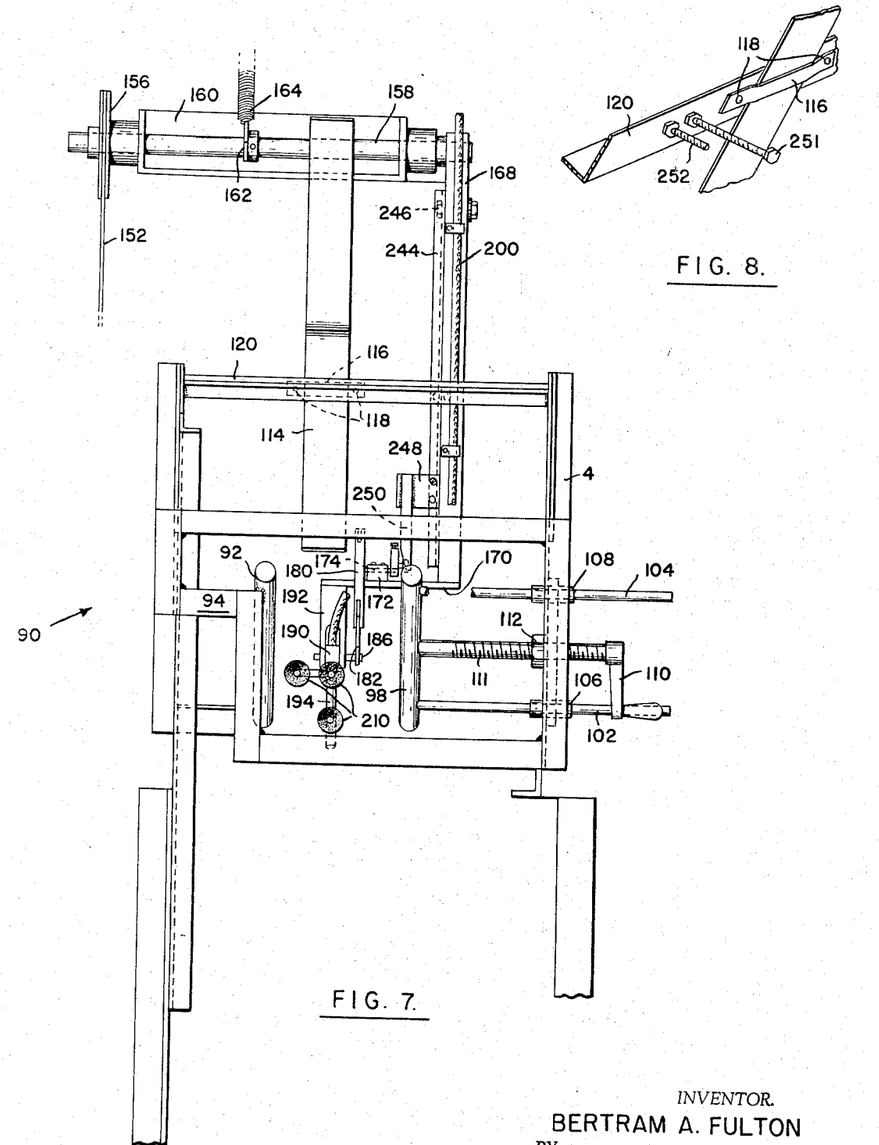
FIGURE 7 is an elevation partially broken away of the apparatus of FIGURE 1 taken on the plane indicated by the line 7—7 in FIGURE 1.
FIGURE 8 is a rear perspective view of stops and holding means shown in FIGURE 7.

Referring now variously to FIGURES 5, 6 and 7, an arm 168 is fixedly secured to shaft 158 and has secured at its lower end an angle bar 170 to which is secured a block 172 in which a shaft 174 is rotatably mounted. Shaft 174 is fixedly secured to lever 176 which is pivotally connected at 178 to a lever 180 which in turn is pivotally secured to a lever 182 as indicated at 184. Lever 182 is fixedly secured to a shaft 186 which is fixedly secured to a block 190 carried in a bifurcated member 192 secured to angle bar 170. A conduit 194 is secured to and passes through block 190 (FIGURE 5) and has a closed end 196 and an open end 198 to which is connected a flexible hose 200. Pipes 204, 206 and 208 (FIGURE 6) are connected to conduit 194 and each are provided with a rubber suction cup 210. A toggle lever 212 (FIGURE 5) is fixedly secured to shaft 174 and is connected to an extension coil spring 214. Lever 212 has a roller 216 which is adapted to engage a camming stop 218, the other end of spring 214 being connected to a pin 220 secured to angle bar 170.

As seen in FIGURE 2, hose 200 is connected to a solenoid valve 224 which has a port 226 connected to the atmosphere and is connected to a line 228 which in turn is connected to a vacuum pump (not shown). Solenoid valve 224 is connected to ground by line 230 and is connected by a line 232 to a microswitch 234 which is connected to a power line 236. Switch 234 has a cam follower operating lever 238 which engages the inside face of cam 142 which has a raised portion 240 which cams lever 238 so as to close switch 234 and connect line 200 to port 226 and disconnect it from line 236.

Referring particularly to FIGURE 5, an arm 244 is pivotally secured to arm 168 as indicated at 246 and carries adjacent its lower end a plate 248 to which is secured a spring leaf 250 (FIGURE 7).

Figure 12:
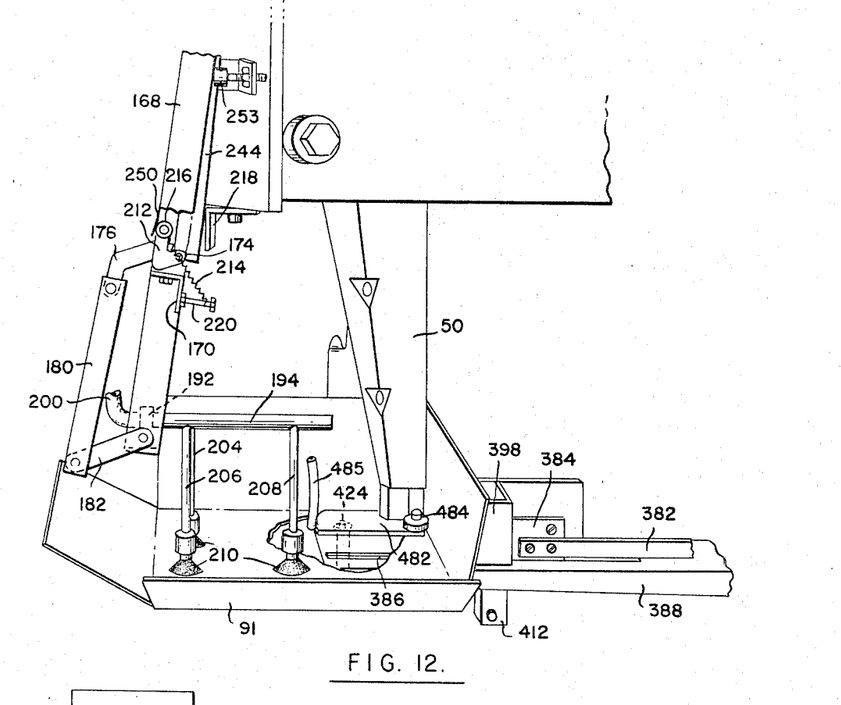
FIGURE 12 is an elevational view illustrating the operation of a portion of the box flat transfer mechanism and erecting mechanism.

A stop 251 secured to cross member 120 (FIGURE 8) is adapted to engage arm 244 while stop 252 also secured to cross member 120 is adapted to engage arm 168. Stop 253 (FIGURE 12) limits the movement of arm 168 towards mandrel 50.

The mechanism for orienting the flat with respect to the anvil 50 will now be described. Referring first to FIGURE 2, a cam 256 is fixedly secured to shaft 14 and is engaged by a cam follower roller 258 secured to a lever 260 pivotally mounted at 262. As indicated at 264, a cable 266 is connected to lever 260 and runs over pulley 268 with its free end being connected at 269 (refer now to FIGURE 9) to a pin 270 passing through and connected to parallel plates 272 and 274 which are connected to a member 276 as by riveting as indicated at 277.

Figure 9:
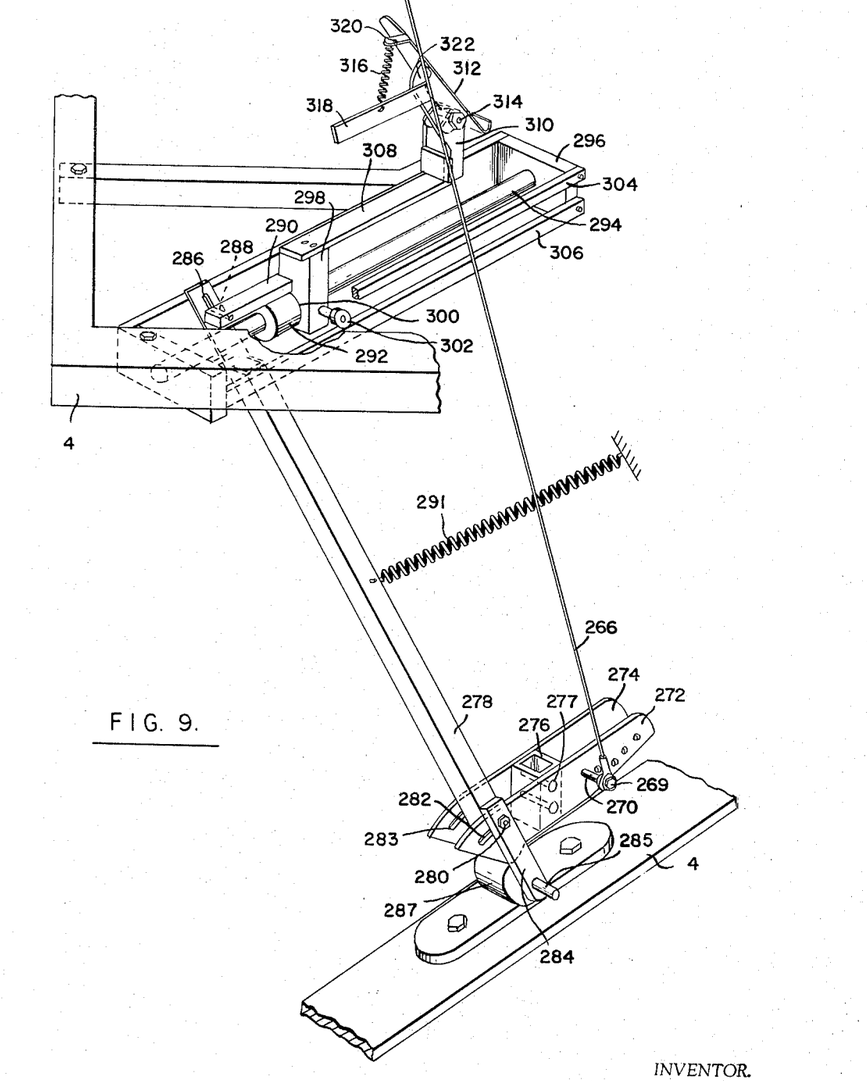
FIGURE 9 is an elevation partially broken away of the apparatus of FIGURE 1 taken on the plane indicated by the line 9—9 in FIGURE 1.

A lever 278 extends between plates 272 and 274 and is connected to these plates by a bolt 280 which passes through a slot 282 in plate 272 and a comparable slot 283 in plate 274, bolt 280 also passing through bar 284 and a comparable bar on the exterior of plate 274 (not shown), these bars being pivotally connected to a pin 285 carried by mounting 287 secured to frame 4. In this manner, lever 278 is adjustably connected to plates 272 and 274.

Figure 15:
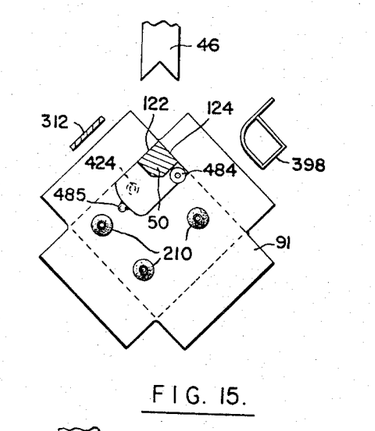
FIGURE 15 is a diagrammatic view showing a box flat after it has been positioned below the anvil.

The upper end of lever 278 has a slot 286 which receives a headed pin 288 fixedly secured to a bar 290. Lever 278 is biased clockwise as viewed in FIGURE 9 by an extension coil spring 291. Bar 290 is secured as by welding to a bushing 292 which slidably engages a rod 294 fixedly secured to a frame 296 which is attached to frame 4. Bushing 292 is also secured to block 298 as by welding at 300, block 298 having an opening (not shown) for the free reception of rod 294. A guide roller 302 is secured to block 298 and passes between guide bars 304 and 306 secured to frame 296. A bar 308 is fixedly secured to block 298 and carries a block 310 to which a pusher member 312 is pivotally secured by a bolt 314. An extension coil spring 316 is connected to bar 318 and to pusher member 312 and 320 to urge pusher member 312 counterclockwise as viewed in FIGURE 9 against stop 322 in a position at an angle to the vertical when it is not engaging a flat against mandrel 50. As seen in FIGURE 15, this mechanism is used to erect and hold one side of a box flat against mandrel 50.

Figure 3:
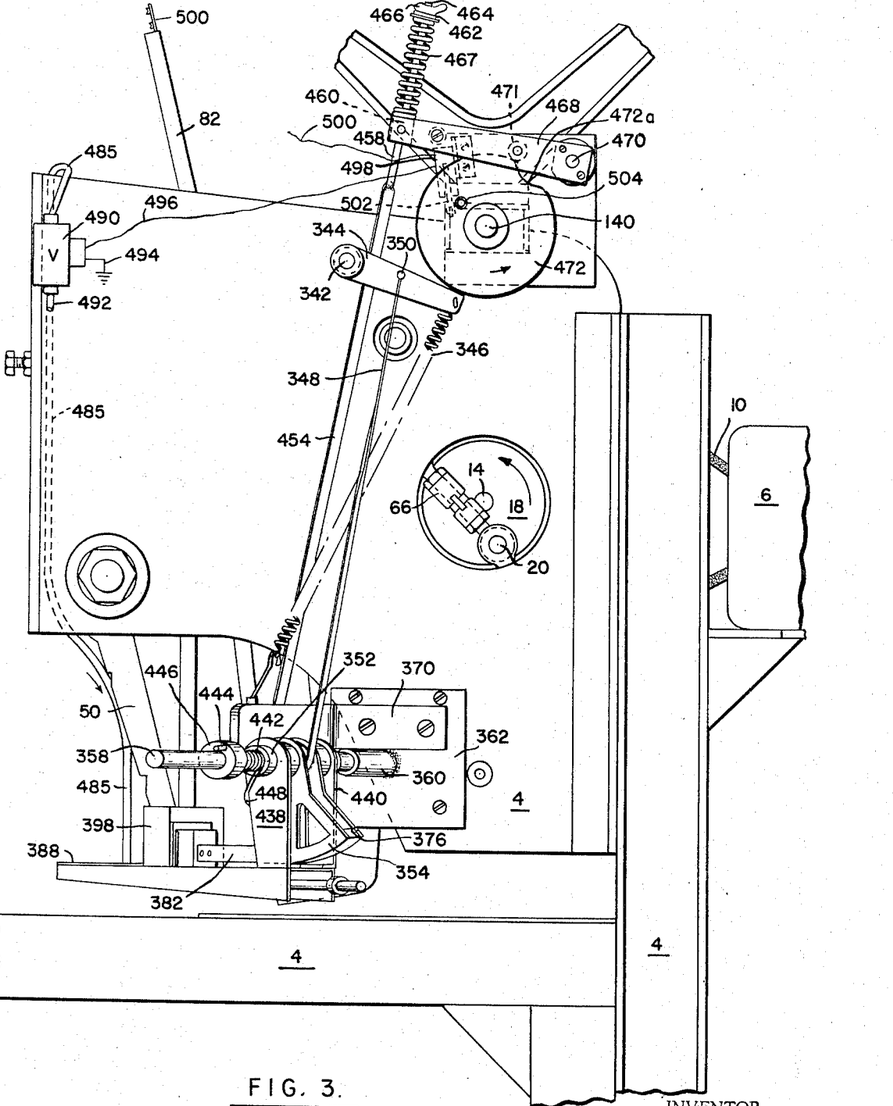
FIGURE 3 is an elevation of the right-hand side of the apparatus of FIGURE 1 as viewed in FIGURE 1 partially broken away.
Figure 10:
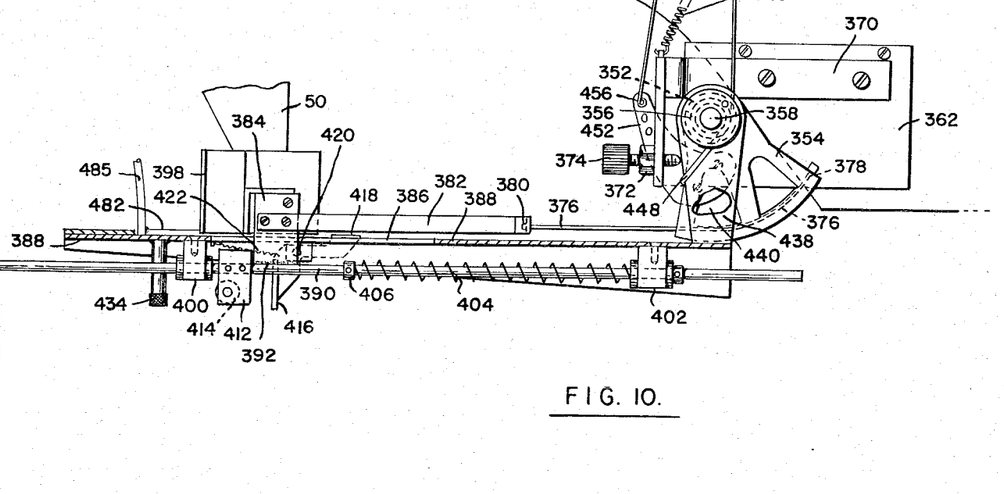
FIGURE 10 is a vertical section partially broken away of the apparatus of FIGURE 1 taken on the planes indicated by the line 10—10 in FIGURE 1.

A second side of the box flat is engaged by the mechanism now to be described. Referring again to FIGURE 2, a cam 326 secured to shaft 14 is engaged by a cam follower roller 328 secured to arm 330 pivotally mounted at 332. Arm 330 is pivotally connected at 334 to a lever 336 which in turn is pivotally connected at 338 to an arm 340 fixedly secured to a shaft 342. Referring now to FIGURE 3, shaft 342 on the side of machine 2 opposite to that on which arm 340 is mounted is fixedly secured to an arm 344 which is spring biased downwardly by an extension coil spring 346. The upper end of a metal strap 348 is secured to arm 344 as indicated at 350 while the lower end of the strap is secured to the exterior of bushing 352 of quadrant 354 at 356 as seen in FIGURE 10. Bushing 352 is mounted for free rotation on shaft 358 which is fixedly secured in a socket member 360 secured to a plate 362 mounted on frame 4 (FIGURE 3). A bracket 370 secured to plate 362 carries a nut 372 (FIGURE 10) through which a threaded stop member 374 passes. Stop member 374 is adapted to engage quadrant 354 to limit its clockwise movement as viewed in FIGURE 10.

A cable 376 has one end connected to quadrant 354 as indicated at 378 and the other end connected at 380 to a bar 382 (FIGURE 10) to which is secured a plate 384 which extends downwardly through a slot 386 in support member 388. Plate 384 is secured to a rod 390 by welding as indicated at 392. A pusher 398 is fixedly secured to plate 384. Rod 390 is slidably mounted in bushing members 400 and 402 which are secured to support member 388. A compression coil spring 404 surrounds rod 390 and has one end abutting against bushing member 402 and the other end abutting against an abutment member 406 secued to rod 390.

A bar 412 secured to rod 390 carries a camming roller 414 which is adapted to engage a cam 416 secured to gripping member 418 pivotally mounted at 420 to support member 388. A spring 422 connects cam 416 and support member 388 to bias gripping member 418 clockwise as viewed in FIGURE 10.

Figure 11:
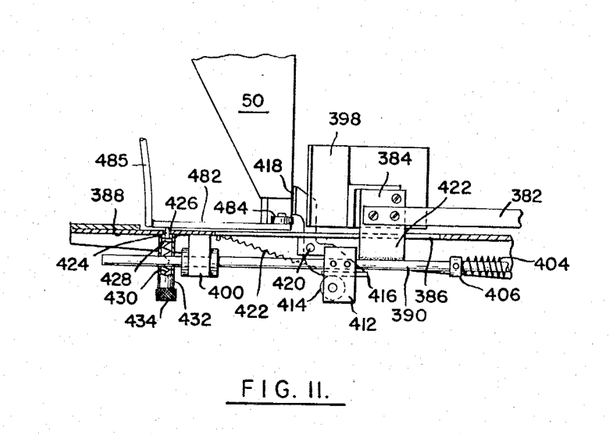
FIGURE 11 is a view of the structure of FIGURE 10 partially broken away showing a different relative position of the parts.

As best seen in FIGURE 11, a plunger 424 passes through an opening 426 in support 388 and has an enlarged head 428 which abuts against a compression coil spring 430 containing in tube 432 secured to support member 388. The lower end of spring 430 abuts against a cap 434 threadably secured to tube 432.

Support member 388 is fixedly secured to a pair of arms 438 and 440 which are mounted for rotation about shaft 358. A torsion spring 442 has one end 444 secured to a retaining member 446 fixedly secured to shaft 358 and its other end engaging arm 438 to bias it counterclockwise as viewed in FIGURE 3.

Referring to FIGURE 10, a bracket 452 is fixedly secured to arm 440 and a metal strap 454 has its lower end secured to bracket 452 as shown at 456. As best seen in FIGURE 3, the upper end of strap 456 is secured to a rod 458 which passes through block 460 and carries a washer 462 on its upper threaded end 464 to which is secured a butterfly nut 466. A compression coil spring 467 surrounds rod 458 and is compressed between block 460 and washer 462. Block 460 is pivotally secured to a bifurcated arm 468 (FIGURES 1 and 3) which is pivotally mounted as indicated at 470 and carries a cam follower roller 471 which engages a cam 472 fixedly secured to shaft 140 which as shown in FIGURE 2 is driven by sprocket 138.

Referring to FIGURE 11, a plate 482 is secured to the bottom of anvil 50 and carries a roller 484 which is tangent to the plane in which anvil face 124 lies and extends slightly beyond the corner of plate 482 in which it is mounted for rotation. A pipe 485 is secured to an edge of plate 482.

Referring now to FIGURE 3, pipe 485 is conected to a valve 490 which in turn is connected to a source of air under pressure by hose 492. Valve 490 is a solenoid valve and is connected to ground by a line 494 and is connected by a line 496 to a microswitch 498, which in turn is connected to a power line 500. Switch 498 has a cam follower operating arm 502 which is adapted to be engaged by cam pin 504 which is secured to cam 472 and projects inwardly thereof and is adapted to engage lever 502 to close switch 458 and in turn open valve 490 to connect pipe 485 to hose 492.

*Operation*

With the exception of FIGURES 10, 12 and 16 through 18, the figures showing the apparatus 2 illustrate the various parts thereof in their proper relative positions for the condition shown in FIGURE 5 with a flat 91 having been removed from the magazine but not yet transferred to the mandrel.

Considering this as the starting point, shaft 140 is rotating cam 472 counterclockwise as viewed in FIGURE 3 which immediately brings cam follower 471 to low portion 472a of cam 472 permitting lever 468 to rotate counterclockwise as viewed in FIGURE 3 responsive to springs 467 and 442 and strap 454 to lower which in turn by force of gravity and the action of spring 442 causes arms 438 and 440 to rotate counterclockwise about shaft 358 as viewed in FIGURE 3 which results in the lowering of support 388 from below mandrel 50 to clear the way for the positioning of flat 91 under mandrel 50.

It will be seen from FIGURE 2 that cam follower 144 is on a uniform radius portion 142a of cam 142. As cam 142 moves clockwise as viewed in FIGURE 2, raised cam portion 142b will engage cam follower 144 forcing lever 146 clockwise as viewed in FIGURE 2 causing cable 152 to rotate quadrant 156 against the action of spring 164 which in turn causes lever 168 to be moved counterclockwise as viewed in FIGURE 5 bringing roller 216 into contact with camming stop 218. This rotates toggle lever 212 and hence shaft 174 and lever 176 to move lever 180 downwardly as viewed in FIGURES 6 and 12. This in turn rotates lever 182 counterclockwise as viewed in FIGURES 6 and 12 which in turn correspondingly rotates block 190 and conduit 194 counterclockwise to position flat 91 in a position immediately below support 482 under mandrel 50, that is to the position shown in FIGURE 12. Cam follower 471 now moves out of cam low portion of 472a to cause the bringing of support 388 up underneath flat 91 so as to support flat 91 immediately after it is positioned beneath support 482.

As support 388 is moving into position to support flat 91, it at the same time is elevating gripping member 418 until it finally engages and erects the adjacent side panel of flat 91 to a vertical position against mandrel 50, gripping member 418 being held in the position shown in FIGURE 11 by virtue of plate 416 being engaged by camming roller 414.

Returning again to FIGURE 2, it will be seen that at the starting position cam 256 is maintaining cam follower 258 and lever 260 in a partially elevated position which in turn through cable 266, plates 272 and 274 causes lever 278 to be held in its counterclockwise position as viewed in FIGURE 9. Thus in turn through the engagement of pin 288 in slot 286 keeps bar 290, bushing 292, block 298, bar 308, block 310 and hence pusher member 312 in a partially retracted position. As cam follower 258 approaches low point 256a in cam 256, cable 266 is lowered as viewed in FIGURE 9 to permit spring 291 to move pusher member 312 to the right as viewed in FIGURE 9. This action is timed so that pusher member 312 will enter underneath a side panel of flat 91 which has been previously positioned as described so that pusher member 312 will act to erect a side panel just before a stay is affixed. It will be noted that pusher member 312 is held by spring 316 at an angle to facilitate entry underneath a side panel. As the pusher member erects the panel, it will pivot clockwise as viewed in FIGURE 9 to a substantially vertical position when the side panel is correspondingly erected to a substantially vertical position.

Returning to FIGURE 2, cam 142 continues to rotate clockwise and permits cam follower 144 to move off the high part 142b of the cam through the action of spring 164 which causes arm 168 to be moved away from flat 91. Just before this occurs, cam 240 closes switch 234 by engaging switch arm 238 to energize solenoid valve 224 and disconnect line 200 from vacuum line 226 and connect it to the atmosphere through line 228 thus deactivating the engagement of flat 91 through suction cups 210. The give in the suction cup 210 and the ability of flat 91 to be bent downwardly provides ample clearance for the movement of pipes 204, 206, and 208 and the suction cups 210 clear of flat 91.

Figure 16:
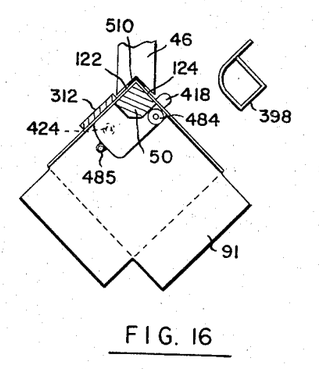
FIGURE 16 is a diagrammatic view showing the box flat of FIGURE 15 just as the stay is being affixed to a corner.
Figure 17:
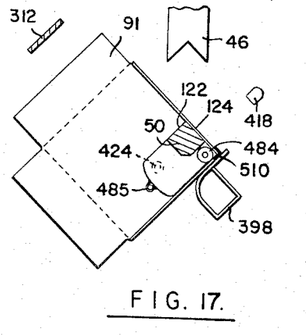
FIGURE 17 is a diagrammatic view showing the flat of FIGURE 15 with a stay affixed to one corner and the box rotated 90° from the position shown in FIGURE 16.

During the previously described operation, the rotation of crank wheel 18 by shaft 14 has been causing bell crank lever 68 to move counterclockwise as viewed in FIGURE 4 to cause pawl 80 to advance the metal stay material 500 to the desired position for affixation to flat 91 and at the same time has been causing die member 46 to move towards mandrel 50 through the action of link 22, latch member 30, link 34 and link 40. After the erection of two of the side panels of flat 91 against mandrel 50, die member 46 affixes the metal stay to the thus made corner and cuts off the stay in the usual manner and after affixing the metal stay, the die member 46 commences to move away from mandrel 50. The point of affixation of the metal stay 510 is illustrated in FIGURE 16.

The operation of the various parts of apparatus 2 after the affixation of stay 500 at the first formed corner will now be described. As previously mentioned, die member 46 retracts clear of mandrel 50 and flat 91. Similarly, cam follower 258 moves away from low point 256a of cam 256 (FIGURE 2) causing the elevation of cable 266 and the consequent retraction of pusher member 312. With die member 46 and pusher member 312 retracted out of the way of box flat 91, cam follower 328 (FIGURE 2) is urged by spring 346 (FIGURE 3) into the low portion 326a of cam 326 permitting through the action of levers 330, 336, 340, shaft 342 and lever 344, strap 348 to move downwardly permitting the rotation of quadrant 354 and thus permitting spring 404 (FIGURE 10) to advance rod 390 to carry pusher 398 forward against the adjacent erected side of box flat 91 to pivot the box 90° about roller 484 to the position shown in FIGURE 17. As rod 390 advances, it carries camming roller 414 (FIGURE 10) away from cam 416 permitting spring 422 to pivot gripping member 418 away from box flat 91 to lower gripping member 418 clear of the turning box flat 91. At this juncture, the various parts are in the position shown in FIGURE 17. Roller 484 facilitates the swinging of box flat 91. The same is true of plunger 424 which keeps a substantial portion of the bottom panel of the box flat from resting in close frictional engagement on support 388.

Figure 18:
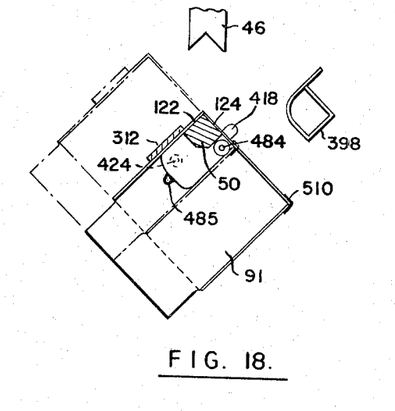
FIGURE 18 is a diagrammatic view of the box flat of FIGURE 15 showing the partially erected flat advanced into position for the affixation of a second stay.

Cam follower 328 then moves out of low spot 326a of cam 326 causing the reverse action with the resultant elevation of cable 348 which rotates quadrant 354 causing cable 376 to retract bar 382 and hence rod 390 against the action of spring 404 to cause the withdrawal of pusher 398 to the position shown in FIGURE 11. As roller 414 is retracted by rod 390, it engages cam 416 and pivots gripping member 418 upwardly to the position shown in FIGURE 11 against the action of spring 422. Gripping member 418 is now in a position to help guide flat 91 which must be advanced by pusher member 312 in order to be properly oriented with mandrel 50. At this stage, flat 91 is in the position shown in phantom lines in FIGURE 18 when all of the parts are as shown in FIGURE 18 in full lines with the exception of pusher 312 which is in the position shown in phantom lines. Cam follower 258 is advancing towards the low portion of cam 256 as previously described to provide for the advancement of pusher member 312 against the adjacent side panel of flat 91 to erect this side panel and to push flat 91 so that the thus erected side panel will come in contact with face 122 of mandrel 50. Shortly thereafter die member 46 affixes a stay to the thus presented corner of the flat 91 in the manner previously described.

Figure 14:
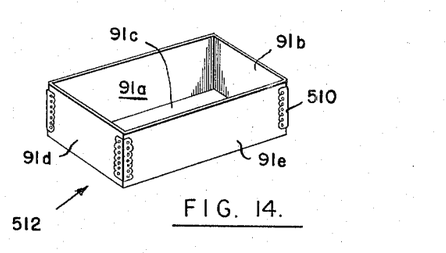
FIGURE 14 is a front elevation of an erected and stayed box made from the flat of FIGURE 13.

This series of operations of turning the flat 91 about roller 484 and moving the box laterally into contact with face 122 of mandrel 50 with the subsequent affixation of a stay is repeated two more times to complete the staying of the four corners of the box and form the completed box designated 512 in FIGURE 14. After the fourth stay is affixed, die member 46 and pusher member 312 again retract as previously described. There being a 1 to 4 ratio between shafts 140 and 14, cam follower 471 enters the low point 472a of cam 472 (FIGURE 3) as previously described to cause the support 388 to drop downwardly clear of the completed box. At approximately the same time, pin 504 engages lever 502 to close switch 498 and in turn energizes solenoid valve 490 to connect pipe 485 to pressure hose 492 which causes a jet of air to be directed against the bottom of the completed box from the lower end of pipe 485 to insure that the completed box will drop downwardly immediately in order to clear the apparatus for the formation of a new box. A new cycle has thus started.

As has been described previously, incident to the movement of cam follower 144 off of high spot 142b of cam 142, arm 168 through the action of spring 154 was moved away from mandrel 50. At the same time, of course, arm 244 is being moved away from mandrel 50 and as arm 244 is carried against stop 251 and arrested, arm 168 carries roller 216 towards spring 250 which causes toggle lever 212 to move clockwise as viewed in FIGURE 12 to move levers 176, 180 and 182 back to their original positions as shown in FIGURE 5. The continued movement of arm 168 brings suction cup 210 into engagement with the adjacent flat 91 in magazine 90. Cam 240 having moved clear of cam lever 238, switch 234 is open and hence solenoid valve 244 is deenergized with line 228 being connected to vacuum line 200 thus causing the suction cup 210 to engage the said flat. When cam follower 144 is engaged by the intermediate raised portion 142a of cam 142, arm 168 is moved to a position intermediate the magazine and the position at which the flat is presented to mandrel 50, i.e. the position shown in FIGURE 5, i.e. the starting position.

At this stage all of the parts of apparatus 2 have returned to the starting point and the cycle of operation described above is repeated. As seen from the above description, shaft 14 makes four complete revolutions for each complete revolution of shaft 140 which provides for the necessary action to stay four corners of flat 91 in the case of each box flat presented.

What is claimed is:
1. In combination,
   an anvil,
   means to support a flat with a corner thereof adjacent an end of the anvil,
   means to erect the side panels of the flap adjacent said corner to position that said side panels adjacent the length of the anvil,
   means to successively position the remaining corners of the flat adjacent the said end of the anvil with the adjacent side panels positioned adjacent the length of the anvil, and
   means to apply a corner stay to each adjacent pair of side panels positioned adjacent the length of the anvil.

2. The combination of claim 1 in which the means to position the remaining corners includes a roller adjacent the anvil adapted to engage the interior of an erected side panel and a pusher arm.

3. The combination of claim 1 in which the means to position the remaining corners includes a roller adjacent the anvil adapted to engage the interior of an erected side panel and a pusher arm and the support has a pin to support a major portion of the flat.

4. In combination,
   means for storing a plurality of box flats,
   an anvil,
   box flat transfer means to remove a flat from the storing means and position one corner of the flat adjacent an end of the anvil,
   a retractable support to support the thus positioned flat,
   means to erect a pair of side panels of the flat to position the said side panels adjacent the length of the anvil,
   means to support a flat with a corner thereof adjacent an end of the anvil,
   means to erect the side panels of the flap adjacent said corner to position the said side panels adjacent the length of the anvil,
   means to successively position the remaining corners of the flat adjacent the said end of the anvil with the adjacent side panels positioned adjacent the length of the anvil, and
   means to apply a corner stay to each adjacent pair of side panels positioned adjacent the length of the anvil.

5. The combination of claim 4 in which the means to position the remaining corners includes a roller adjacent the anvil adapted to engage the interior of an erected side panel and a pusher arm.

6. The combination of claim 4 in which the means to position the remaining corners includes a roller adjacent the anvil adapted to engage the interior of an erected side panel and a pusher arm and the support has a pin to support a major portion of the flat.

7. In combination,
an anvil having a first face and a second face extending lengthwise of the anvil,
a retractable support to support a flat with a corner thereof adjacent an end of the anvil,
means to position said support in a flat supporting position adjacent the anvil and to retract the support after the corners of the flat have been stayed,
means on said support to position the side of the flat opposite to the said first face of the anvil adjacent the said first face,
means to successively rotate the box flat substantially 90° about the anvil,
means to successively position the sides of the flat opposite the second face of the anvil adjacent the said second face, and
means to apply a corner stay to each adjacent pair of panels positioned adjacent the faces of the anvil.

8. The combination of claim 7 in which the rotating means includes a roller adjacent the anvil to engage the inner face of an erected side panel and a pusher arm.

9. The combination of claim 7 in which the means to position the remaining corners includes a roller adjacent the anvil adapted to engage the interior of an erected side panel and a pusher arm and the support has a pin to support a major portion of the flat.

10. The combination of claim 7 having means to direct an air jet against the stayed flat on the retraction of the support.

11. The combination of claim 7 in which the means to position sides of the flat adjacent the second face of the anvil includes a pusher arm.

12. In combination,
means for storing a plurality of box flats,
an anvil having a first face and a second face extending lengthwise of the anvil,
box flat transfer means to remove a flat from the storing means and position one corner of the flat below an end of the anvil,
a retractable support to support the thus positioned flat below the anvil,
means to position said support in a flat supporting position adjacent the anvil and to retract the support after the corners of the flat have been stayed,
means on said support to position the side of the flat opposite to the said first face of the anvil adjacent the said first face,
means to successively rotate the box flat substantially 90° about the anvil,
means to successively position the sides of the flat opposite the second face of the anvil adjacent the said second face, and
means to apply a corner stay to each adjacent pair of panels positioned adjacent the faces of the anvil.

13. The combination of claim 12 in which the rotating means includes a roller adjacent the anvil to engage the inner face of an erected side panel and a pusher arm.

14. The combination of claim 12 in which the means to position the remaining corners includes a roller adjacent the anvil adapted to engage the interior of an erected side panel and a pusher arm and the support has a pin to support a major portion of the flat.

15. The combination of claim 12 having means to direct an air jet against the stayed flat on the retraction of the support.

16. The combination of claim 12 in which the means to position sides of the flat adjacent the second face of the anvil includes a pusher arm.

References Cited
UNITED STATES PATENTS

| | | | |
|---|---|---|---|
| 793,549 | 6/1905 | Stokes | 227—86 |
| 2,838,757 | 6/1958 | Holtkamp | 29—243.57 |
| 2,997,714 | 8/1961 | Speidel | 227—1 |
| 3,076,389 | 2/1963 | Speidel | 93—41.1 |
| 3,078,769 | 2/1963 | Flynn et al. | 93—49 X |
| 3,080,796 | 3/1963 | Twitchell et al. | 93—41 |

MILTON S. MEHR, *Primary Examiner.*